United States Patent
Ido

(10) Patent No.: US 8,504,781 B2
(45) Date of Patent: Aug. 6, 2013

(54) METHODS AND SYSTEMS FOR INTER-PROCESSOR COMMUNICATION UNDER A MULTIPROCESSOR ENVIRONMENT

(75) Inventor: Tetsuo Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 693 days.

(21) Appl. No.: 12/577,594

(22) Filed: Oct. 12, 2009

(65) Prior Publication Data

US 2010/0095072 A1 Apr. 15, 2010

(30) Foreign Application Priority Data

Oct. 14, 2008 (JP) .................................. 2008-265180

(51) Int. Cl.
  *G06F 12/00* (2006.01)
  *G06F 13/00* (2006.01)
  *G06F 13/28* (2006.01)

(52) U.S. Cl.
  USPC ............................ 711/153; 711/118; 711/170

(58) Field of Classification Search
  USPC ................................ 711/118, 147, 153, 170
  See application file for complete search history.

(56) References Cited

U.S. PATENT DOCUMENTS

| 6,466,988 | B1 | 10/2002 | Sukegawa | |
|---|---|---|---|---|
| 2004/0073910 | A1* | 4/2004 | Hokenek et al. | 719/310 |
| 2007/0143546 | A1* | 6/2007 | Narad | 711/130 |
| 2007/0162701 | A1* | 7/2007 | Schlansker et al. | 711/118 |
| 2009/0216953 | A1* | 8/2009 | Rossi | 711/128 |

FOREIGN PATENT DOCUMENTS

| JP | 8-305633 A | 11/1996 |
|---|---|---|
| JP | 2000-194680 A | 7/2000 |

* cited by examiner

*Primary Examiner* — Ryan Bertram

(74) *Attorney, Agent, or Firm* — Carter, DeLuca, Farrell & Schmidt LLP

(57) ABSTRACT

A method is provided for sending and receiving data between a first processor including a first cache memory and a second processor including a second cache memory via a shared memory. The method includes classifying, by the first processor, a transfer data area that stores data transferred between the first and second processors in the shared memory as a first area filling one cache line and a second area not filling one cache line, copying, by the first processor, data in the second area into a divided data area in the shared memory, the divided data area being aligned with a cache line in the first cache memory, and processing, by the second processor, the data in the first area and the data in the divided data area as data from the first processor.

23 Claims, 5 Drawing Sheets

SHARED MEMORY

METHODS AND SYSTEMS FOR INTER-PROCESSOR COMMUNICATION UNDER A MULTIPROCESSOR ENVIRONMENT

BACKGROUND OF THE INVENTION

1. Field of the Invention

The present invention relates to an inter-processor communication technology under a multiprocessor environment.

2. Description of the Related Art

There is a communication offload technology for executing communication processing by a main processor and another processor to advance high-speed communication processing and load reduction. In such a multiprocessor processing, a shared memory is arranged between the processors and communication is performed between the processors via the shared memory.

For example, a shared memory is arranged between a main system on the main processor side, in which an application is operated, and a subsystem on the communication offload processor side. The main processor writes transfer data into the shared memory and delivers address information in a memory area, where the transfer data is written, to the communication offload processor by inter-processor communication. The communication offload processor reads the transfer data using the delivered address information and executes sending and receiving processing to an external device.

When the multiprocessing system executes data transfer between the processors via the shared memory, the system is required to suitably process data cached in a cache memory included in each processor. If the system does not suitably process to write the data cached in the cache memory into the shared memory, there is a possibility that the data in the shared memory is overwritten, so that the system cannot be normally operated.

For example, a cache memory having a configuration having a plurality of cache lines having a fixed length (e.g., 32-byte length) is considered. In such a cache memory, when data cached in the cache memory of each processor is written into a shared memory, a system needs to perform control so that other data does not exist on the cache lines to be written. This is because a cache writing operation is performed per cache line. If this restriction is not protected, the cache writing operation overwrites the other data area existing on the same cache line. In order to prevent this overwriting, it is necessary that an application prepares data in which a transfer data writing area in a shared memory is aligned with a cache line in a cache memory or processes to copy the data to an aligned area. Such processing becomes complicated. Further, a conventionally used application not having such processing is inapplicable for a multiprocessor environment as it is.

Further, when the system transfers data between processors via a shared memory, it can be also considered that a cache function is made to be turned off.

However, when the cache function is made to be completely turned off, the performance of the system decreases and communication throughput decreases greatly.

Japanese Patent Application Laid-Open No. 8-305633 and U.S. Pat. No. 6,466,988 (Japanese Patent Application Laid-Open No. 2000-194680) discuss a data transfer system using a shared memory under a multiprocessor environment.

The system discussed in Japanese Patent Application Laid-Open No. 8-305633 performs an operation for invalidating data corresponding to a reference area cached in a cache memory included in a self-processor when the system refers to a data area belonging to another processor. The system discussed in U.S. Pat. No. 6,466,988 (Japanese Patent Application Laid-Open No. 2000-194680) automatically synchronizes content of a cache memory included in each processor by including a coherence function in a cache memory on the system.

As for aforementioned description, complicated processing is necessary for preventing overwriting data in a shared memory. Further, there is a possibility that a conventionally used application that is not a multiprocessor system is inapplicable to the multiprocessor environment as it is.

Furthermore, a method not using a cache function reduces the performance of a system.

SUMMARY OF THE INVENTION

The present invention is directed to a method capable of applying an application to a multiprocessor environment without conscious of alignment to a cache line in a transfer data area in the application.

According to an aspect of the present invention, a method is provided for sending and receiving data between a first processor including a first cache memory and a second processor including a second cache memory via a shared memory. The method includes classifying, by the first processor, a transfer data area that stores data transferred between the first and second processors in the shared memory, as a first area filling one cache line in the first cache memory and a second area not filling one cache line; copying, by the first processor, data in the second area into a divided data area in the shared memory, the divided data area being aligned with a cache line in the first cache memory; and processing, by the second processor, data in the first area and data in the divided data area as data from the first processor.

According to another aspect of the present invention, a method is provided for sending and receiving data via a shared memory between a first processor including a first cache memory and a second processor including a second cache memory. The method includes classifying, by the first processor, a transfer data area that stores data transferred between the first and second processors in the shared memory, as a first area filling one cache line in the first cache memory and a second area not filling one cache line; securing, by the first processor, a divided data area aligned with a cache line in the first cache memory in the shared memory; writing, by the second processor, data transferred between the first and the second processors into the first area and the divided data area in the shared memory; and processing, by the first processor, data written into the first area and the divided data area in the shared memory as data from the second processor.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

As for exemplary embodiments, a communication offload system which processes communication processing of a layer lower than a transmission control protocol/internet protocol (TCP/IP) by a communication offload processor and reduces load of an application processor is described.

Figure 1:
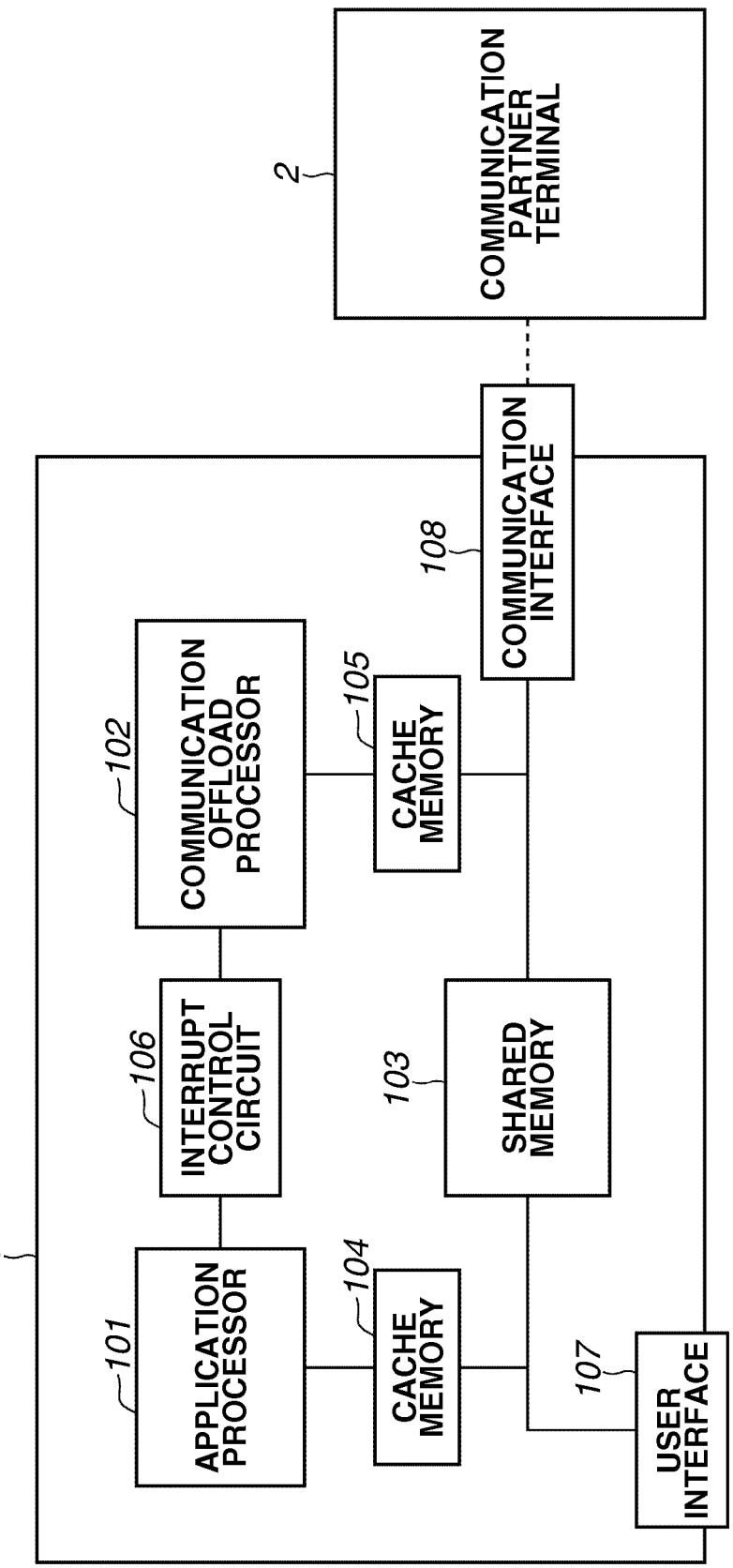
FIG. 1 illustrates an example of a configuration of a communication offload system according an exemplary embodiment of the present invention.

FIG. 1 illustrates an example of a configuration of a communication offload system according to an exemplary embodiment of the present invention.

The system of the present exemplary embodiment is a communication apparatus 1 connecting with an external communication apparatus 2 via a wired local area network (LAN) (or a wireless LAN) and capable of performing a TCP/IP packet communication with the communication apparatus 2.

The communication apparatus 1 is a multiprocessor system including an application processor 101 and a communication offload processor 102.

The application processor 101 is a first processor used for processing a server message block (SMB), a mail application, and the like. The application processor 101 functions as a main processor of the communication apparatus 1.

The communication offload processor 102 is a second processor used for processing TCP/IP, a communication driver, and the like. The communication offload processor 102 functions as a sub-processor of the communication apparatus 1. That is, the communication offload processor 102 bears communication processing of a layer lower than the TCP/IP, so that load of the application processor 101 can be reduced.

A shared memory 103 is a memory capable of being referred to and written from both the application processor 101 and the communication offload processor 102.

A cache memory 104 is a first cache memory of the application processor 101 and includes a plurality of cache lines having 32 byte length. For example, a whole capacity of the cache memory 104 is 1 MB. The application processor 101 can write/receive data into/from the shared memory 103 by writing/receiving data into/from the cache memory 104.

A cache memory 105 is a second cache memory of the communication offload processor 102 and includes a plurality of cache lines having 32 byte length. For example, a whole capacity of the cache memory 105 is 1 MB.

The communication offload processor 102 can write/receive data into/from the shared memory 103 by writing/receiving data into/from the cache memory 105. When writing/receiving data into/from the shared memory 103 are performed via the cache memories 104 and 105, an area corresponding to an area used in the shared memory 103 is secured in the cache memories 104 and 105. That is, the same area is secured in the cache memories 104 and 105, and the shared memory 103, and data written into a predetermined area in a cache memory by the processor is written into a corresponding area in the shared memory. In the case of reading, when the processor reads data in the predetermined area in the shared memory, the processor writes the read data into the corresponding area in the cache memory and processes the data.

An interrupt control circuit 106 controls an interrupt signal to the communication offload processor 102 and an interrupt signal to the application processor 101. A user interface 107 is an interface for performing a user operation and result outputting (a display or the like). A communication interface 108 sends and receives data via the wired LAN (or the wireless LAN).

Here, the application processor 101 and the communication offload processor 102 are operated by an individual operating system (OS) and each OS may have the same type or a different type. A general Berkeley software distribution (BSD) socket application programming interface (API) is mounted on the application processor 101 side and an entity of the socket is mounted on the communication offload processor 102 side. Each processing below is executed based on processing of the OS of each processor. However, each processor may include a hard configuration (unit) for executing each processing. For example, in the processing in FIGS. 2 and 3, each processor may include a hard configuration for executing each step in FIGS. 2 and 3.

The shared memory 103 can be divided into a cache area and a non-cache area. In order to simplify the description, the cache area and the non-cache area are set to have the same arrangement when seeing from the application processor 101 and the communication offload processor 102.

The application processor 101 can send an interrupt signal to the communication offload processor 102. Similarly, the communication offload processor 102 can send an interrupt signal to the application processor 101.

The interrupt signal may be connected so as to enable to directly transmit to a partner processor, or the interrupt control circuit 106 may be arranged for relaying the interrupt signal.

Figure 2:
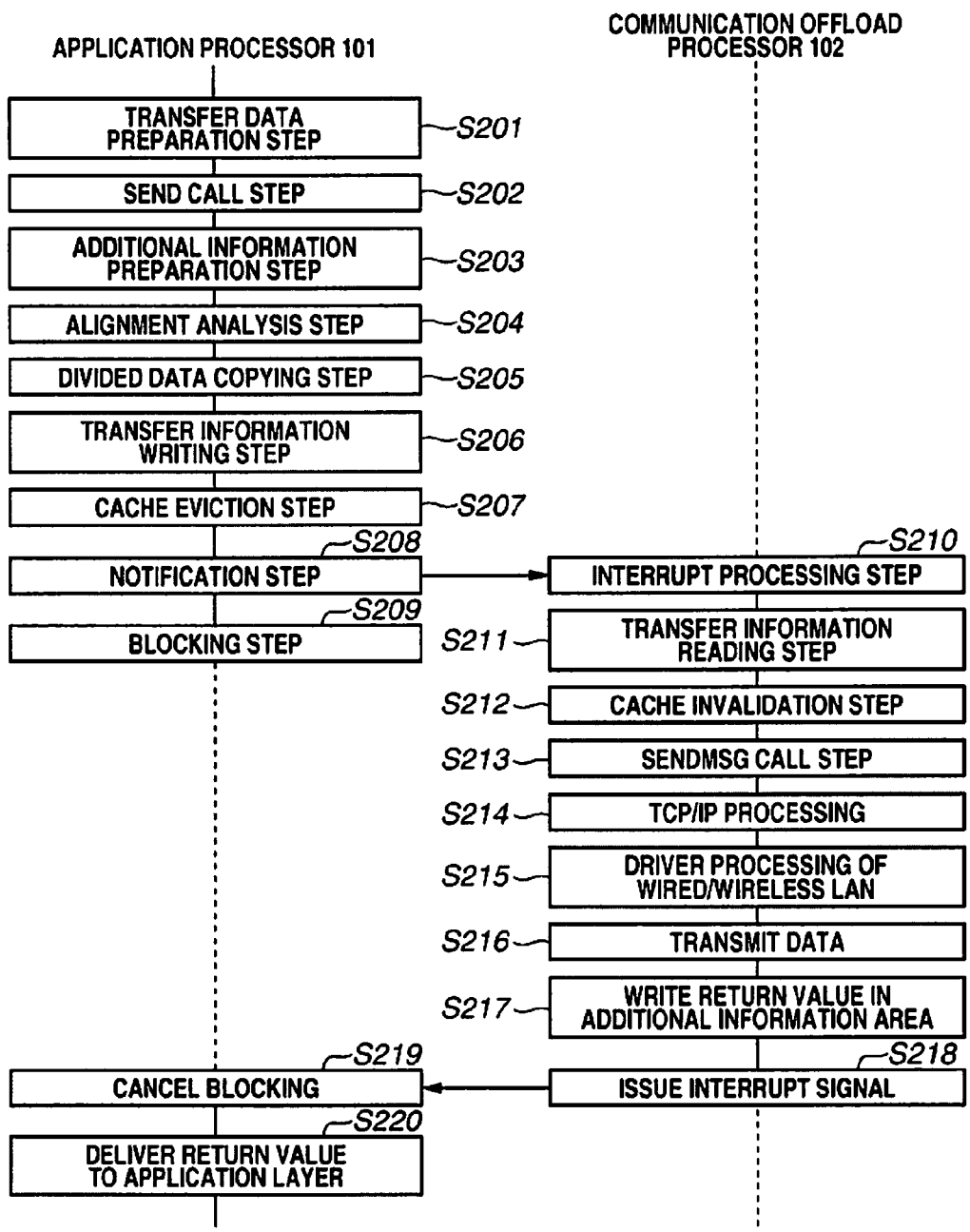
FIG. 2 illustrates a processing sequence according to a first exemplary embodiment of the present invention.
Figure 3:
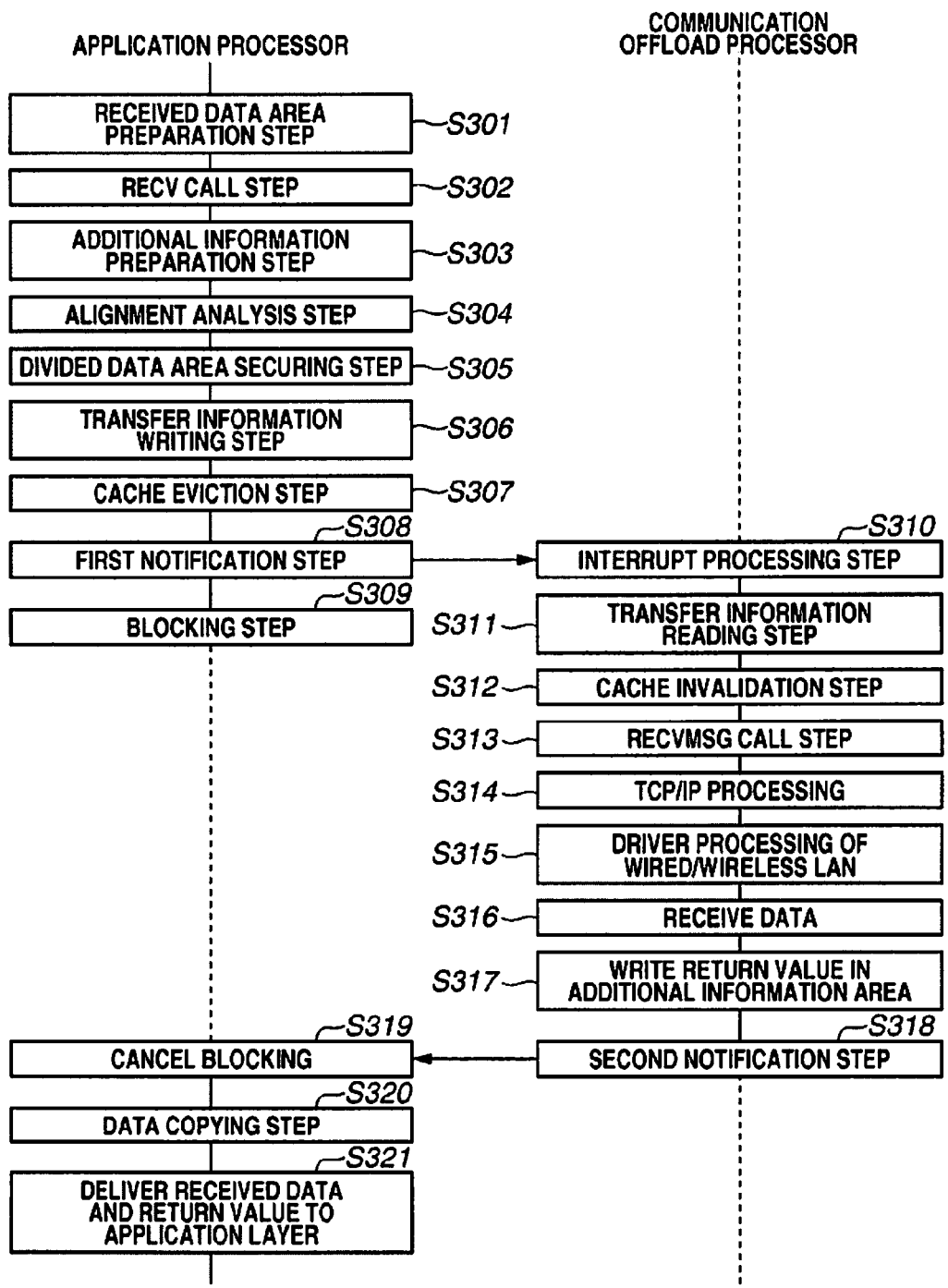
FIG. 3 illustrates a processing sequence according to a second exemplary embodiment of the present invention.

FIG. 2 illustrates a processing sequence according to the present exemplary embodiment.

The following is a processing when a user operates the user interface 107 of the communication apparatus 1 and transfers data to the communication apparatus 2. The application processor 101 performs writing data into the shared memory 103 and reading data from the shared memory 103 via the cache memory 104. Further, the communication offload processor 102 performs writing data into the shared memory 103 and reading data from the shared memory 103 via the cache memory 105. That is, when these processors write data into the shared memory 103, a content of the cache memory 104 or 105 is reflected to the shared memory 103. Further, when these processors read data from the shared memory 103, a content of the shared memory 103 is reflected to the cache memory 104 or 105.

In transfer data preparation step S201, the application processor 101 prepares transfer data on the shared memory 103 in an application layer. An area where the transfer data is prepared is made to be a transfer data area.

In SEND call step S202, the application processor 101 causes a pointer in the transfer data area to be one of arguments and calls SEND which is one of a socket API.

In additional information preparation step S203, the application processor 101 secures an additional information area in the non-cache area on the shared memory 103. The application processor 101 uses the additional information area as an argument information area for delivering other argument information of the SEND to the communication offload processor 102 and a return value area for receiving a return value from the communication offload processor 102.

Figure 4:
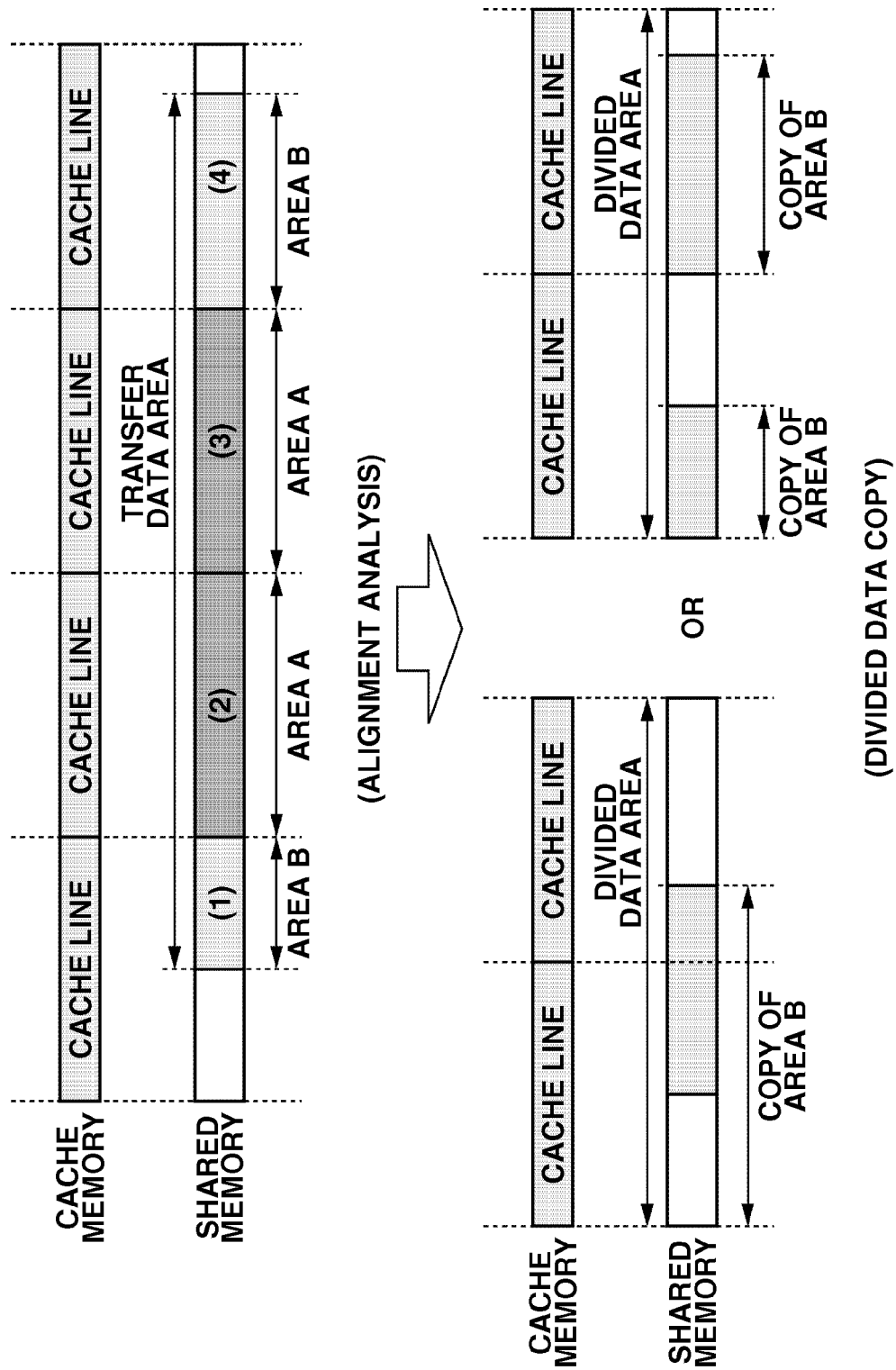
FIG. 4 illustrates an alignment analysis and a divided data copy.

In alignment analysis step S204, the application processor 101 subjects the transfer data area and the cache line in the cache memory 104 to an alignment analysis. The transfer data on the shared memory 103 is set in the transfer data area. The application processor 101 classifies the transfer data area into an area A (a first area) filling a whole of a cache line and an area B (a second area) not filling (refer to FIG. 4). That is, the application processor 101 determines whether data is stored from a head of the cache line or from a middle of the cache line for every cache line. An area where a whole of one cache line becomes a transfer data area is classified to an area A, and an area where only a part of one cache line becomes a transfer data area is classified to an area B (refer to in FIG. 4). In FIG. 4, the area B includes both an area including a head of the transfer data area and an area including an end of the transfer data area. However, there is a case that a head of the transfer data area agrees with a head of a cache line or a case that an end of the transfer data area agrees with an end of a cache line. In these cases, the area B is either of the area including the head of the transfer data area, the area including the end of the transfer data area, or not existed.

Figure 5:
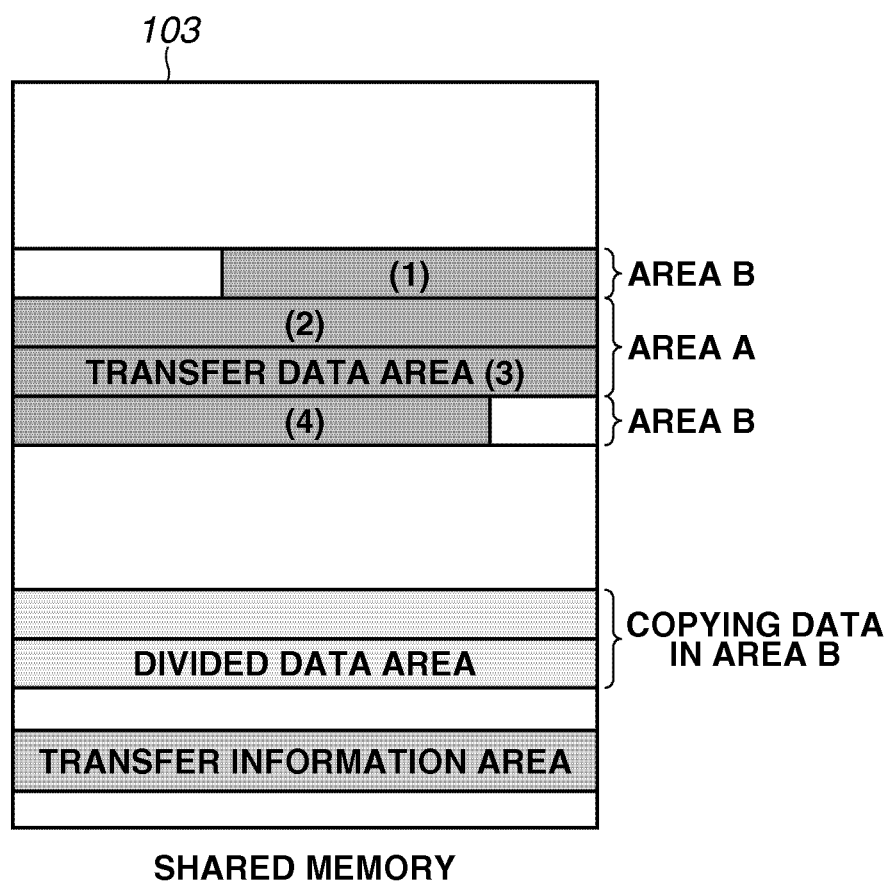
FIG. 5 illustrates an example of an area configuration of a shared memory according to an exemplary embodiment of the present invention.

In divided data copy step S205, the application processor 101 performs a memory copy of data in the area B to the divided data area which is an area on the shared memory 103 and aligned with a cache line of the cache memory 104 (refer to FIGS. 4 and 5).

In transfer information writing step S206, the application processor 101 writes transfer information into a transfer information area which is a non-cache area in the shared memory 103. The transfer information can identify the area A, the divided data area, and an additional information area.

In cache eviction step S207, the application processor 101 writes data in the area A and the divided data area into a transfer data area in the shared memory 103 from the cache memory 104.

In notification step S208, the application processor 101 issues an interrupt signal to the communication offload processor 102 and notifies completion of transfer preparation.

In blocking step S209, the application processor 101 blocks a task which called the SEND.

In the aforementioned description, the notification step S208 can be realized by issuing the interrupt signal by the interrupt control circuit 106, but can be realized by other methods. For example, the notification step S208 can be realized by using a register capable of being written from the application processor 101 and being referred to from the communication offload processor 102. In this case, the application processor 101 changes the register to be a predetermined value and the communication offload processor 102 detects that the value of the register is changed to the predetermined value. Further, the notification step S208 can be also realized by a processing in which the application processor 101 changes a predetermined area in the shared memory 103 to a predetermined value and the communication offload processor 102 detects that the predetermined area is changed to the predetermined value.

In interrupt processing step S210, the communication offload processor 102 detects that the application processor 101 completes the preparation of transfer data, by the interrupt signal.

In transfer information reading step S211, the communication offload processor 102 reads the transfer information from the transfer information area. In cache invalidation step S212, the communication offload processor 102 invalidates the area A and the divided data area which are identified by the transfer information in the cache memory 105.

In SENDMSG call step S213, the communication offload processor 102 executes sending processing by making the area A and the divided data area as transfer data and the additional information area as the other arguments, and calling SENDMSG which is one of the socket API.

The SENDMSG is one of the API of a socket which can send data in a divided area. The SEND can be used instead of the SENDMSG. In order to use the SEND, the communication offload processor 102 once copies the data in the area A and the divided data area, makes one continuous data area, and then executes the SEND.

When the SENDMSG (or SEND) is called, the communication offload processor 102 executes a TCP/IP processing S214 and a driver processing of a wired/wireless LAN S215 and performs data sending S216 to the communication apparatus 2. That is, when the SENDMSG (or SEND) is called, the communication offload processor 102 reads the transfer data from the shared memory 103 and writes the transfer data into the cache memory 105. Then, the communication offload processor 102 sends data in the area A and data in the divided data area, which are written into the cache memory 105, as transfer data. In step S217, the communication offload processor 102 writes a return value, which is a value after processing SENDMSG (or SEND), into a return value area in the additional information area.

In step S218, the communication offload processor 102 issues an interrupt signal to the application processor 101 and notifies completion of sending processing.

In step S219, the application processor 101 cancels blocking of the task which has called the SEND by the interrupt signal issued from the communication offload processor 102 in step S218. In step S220, the application processor 101 delivers the return value to the application layer.

In the aforementioned processing, a suitable communication offload under a multiprocessor environment can be realized using inter-processor communication via the shared memory 103.

Further, in the aforementioned processing, the communication apparatus 1 may secure an argument information area of the SEND and a return value area in the cache area on the shared memory 103 and make it to be a transfer data area including this cache area. In this case, the communication offload processor 102 writes a return value and performs processing for writing caching data in the return value area into the shared memory 103. Then, before the application processor 101 refers to data in the return value area, the communication offload processor 102 invalidates the caching data in the return value area.

Then, processing when a user operates the user interface 107 of the communication apparatus 1 and receives data from the communication apparatus 2 will be described.

In received data area preparation step S301, the application processor 101 prepares a received data area (a transfer data area) for receiving data in the application layer on the shared memory 103.

In RECV call step S302, the application processor 101 causes a pointer in the received data area to be one of arguments and calls RECV which is one of the socket API.

In additional information preparation step S303, the application processor 101 secures an additional information area in a non-cache area on the shared memory 103. The application processor 101 uses the additional information area as an argument information area for delivering another argument information of the RECV to the communication offload processor 102 and a return value area for receiving a return value from the communication offload processor 102.

In alignment analysis step S304, the application processor 101 subjects a received data area on the shared memory 103 and a cache line in the cache memory 104 to an alignment analysis. The application processor 101 classifies the received data area into an area A filling a whole of the cache line and an area B not filling (refer to FIG. 4). That is, the application processor 101 determines whether the application processor 101 secures from a head of the cache line as the received data area or from a middle of the cache line as the received data area. Then, the application processor 101 classifies an area where a whole of a cache line becomes a received data area as an area A and an area where only a part of a cache line becomes a received data area as an area B (refer to FIG. 4).

In divided data area securing step S305, the application processor 101 secures a divided data area, where data in the area B is copied, in an area which is on the shared memory 103 and aligned with the cache line in the cache memory 104 (refer to FIGS. 4 and 5).

In transfer information writing step S306, the application processor 101 writes transfer information in a transfer information area which is a non-cache area in the shared memory 103. The transfer information can identify the area A, the divided data area, and the additional information area.

In cache eviction step S307, the application processor 101 writes back data cached in the area A and the divided data area in the cache memory 104 to the shared memory 103 (or cancels the cached data).

In first notification step S308, the application processor 101 issues an interrupt signal to the communication offload processor 102.

In blocking step S309, the application processor 101 blocks a task which has called the RECV.

Here, it is described that the first notification step S308 can be realized by issuing the interrupt signal by the interrupt control circuit 106. However, the step 308 can be realized by other methods. For example, the step S308 can be realized by using a register capable of being written from the application processor 101 and referred to from the communication offload processor 102. In this case, the application processor 101 changes the register to be a predetermined value and the communication offload processor 102 detects that the value of the register is changed to the predetermined value.

Further, the first notification step S308 can be also realized by a processing in which the application processor changes a predetermined area in the shared memory 103 to a predetermined value and the communication offload processor detects that the predetermined area is changed to the predetermined value.

In interrupt processing step S310, the communication offload processor 102 detects that the application processor 101 completes the preparation for receiving, by the interrupt signal.

In transfer information reading step S311, the communication offload processor 102 reads the transfer information from the transfer information area.

In cache invalidation step S312, the communication offload processor 102 invalidates the area A and the divided data area which are identified by transfer information in the cache memory 105.

In RECVMSG call step S313, the communication offload processor 102 makes the area A and the divided data area as a received data area and the additional information area as the other arguments. The communication offload processor 102 calls RECVMSG, which is one of the socket API, and executes receiving processing.

The RECVMSG is one of the API of the socket which can receive data to a divided area. Further, the RECV can be used instead of the RECVMSG. In order to use the RECV, the communication offload processor 102 once receives the data in one continuous data area by the RECV, copies the received data to the area A and the divided data area, and executes it.

When the RECVMSG (or RECV) is called, the communication offload processor 102 executes a TCP/IP processing S314 and a driver processing of a wired/wireless LAN S315, and performs data receiving processing S316 from the communication apparatus 2. The data received in the data receiving processing S316 is stored in a received data area (transfer data area) in the cache memory 105. The data in the area B is copied to the divided data area. Data in the received data area (transfer data area) and data in the divided data area in the cache memory 105 are written into the shared memory 103.

In step S317, the communication offload processor 102 writes a return value, which is a value after processing the RECVMSG (RECV), into a return value area in the additional information area.

In second notification step S318, the communication offload processor 102 issues an interrupt signal and notifies completion of receiving processing to the application processor 101. In step S319, the application processor 101 cancels the blocking of a task which has called the RECV by the interrupt signal. In step S320, the application processor 101 copies the receiving data written in the transfer data area and the divided data area to the cache memory 104. The application processor 101 copies the data in the divided data area, which is copied in the cache memory 104, to the area B. In step S321, the application processor 101 makes the data in the received data area (transfer data area) in the cache memory 104 as receiving data and delivers the receiving data and the return value to the application layer.

In addition, the application processor 101 copies the data in the divided data area, which is copied to the cache memory 104, to the area B and makes the data in the received data area (transfer data area) as the receiving data. However, the application processor 101 may make data in the area A and the divided data area as the receiving data and deliver it to the application layer.

Here, the second notification step S318 is realized by issuing the interrupt signal by the interrupt control circuit 106, but can be realized by other methods. For example, the second notification step S318 can be realized by using a register capable of being written from the application processor and referred to from the communication offload processor. In this case, the application processor 102 changes the register to be a predetermined value and the communication offload processor 102 detects that the value of the register is changed to the predetermined value.

In addition, the second notification step S318 can be realized by a processing in which the application processor 101 changes a predetermined area in the shared memory 103 to a predetermined value and the communication offload processor 102 detects that the predetermined area is changed to the predetermined value.

By the aforementioned processing, a suitable communication offload can be realized in a multiprocessor environment utilizing an inter-processor communication via the shared memory 103.

Further, in the aforementioned processing, the communication apparatus may secure the argument information area of the RECV and the return value area in the cache area on the shared memory 103 and perform transfer by inter-processor communication including this cache area. In this case, after writing a return value in the communication offload processor 102, the communication apparatus performs a processing for writing back the cached data in the return value area to the shared memory 103. Then, before referring to the data in the return value area in the application communication processor 101, the communication offload processor 102 invalidates the cached data in the return value area.

Accordingly, a fault that data in a shared memory is overwritten to an application and causes a problem can be avoided by the comparatively easy processing. Since a cache function is not completely turned off, lowering a communication throughput can be reduced. Since it is not necessary to execute an alignment processing to a cache line in a transfer data area in an application, a conventionally used application, which is not a multiprocessor system, can be used continuously by diverting.

Since a high-grade function, e.g., a coherence function, is not necessary, a communication subsystem can be realized using a low price processor. Since a whole of transfer data does not need to be copied, a time required for inter-processor communication processing can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-265180 filed Oct. 14, 2008, which is hereby incorporated by reference herein in its entirety.

What is claimed is:

1. A method for sending and receiving data between a first processor including a first cache memory and a second processor including a second cache memory via a shared memory, the first and second cache memories having a plurality of cache lines having a fixed length, the method comprising:
classifying, by the first processor, a transfer data area that stores data transferred between the first and second processors in the shared memory, as a first area filling a whole of one cache line in the first cache memory and a second area not filling one cache line in the first cache memory;
copying, by the first processor, data in the second area into a divided data area in the shared memory, the divided data area being aligned with a cache line in the first cache memory; and
processing, by the second processor, while treating data in the divided data area as data in the second area, data in the first area and data in the divided data area as data from the first processor.

2. The method according to claim 1, further comprising:
analyzing, by the first processor, cache lines of the first cache memory and the shared memory, and classifying the transfer data area as the first area and the second area.

3. The method according to claim 1, further comprising:
writing, by the first processor, information for identifying the first area and the divided data area into a predetermined area in the shared memory; and
invalidating, by the second processor, data in an area of the second cache memory corresponding to data in the first area and data in the divided data area based on the information.

4. The method according to claim 3, wherein the predetermined area is a non-cache area in the shared memory.

5. The method according to claim 1, wherein the second area is at least one of an area including a head of the transfer data area and an area including an end of the transfer data area.

6. The method according to claim 1, further comprising:
evicting, by the first processor, data in an area in the first cache memory corresponding to the first area and the divided data area in the shared memory to the shared memory, after copying data in the second area to the divided data area.

7. The method according to claim 1, further comprising:
reading, by the second processor, the shared memory after receiving a notification of completion of transfer preparation from the first processor.

8. The method according to claim 7, wherein the notification is performed by sending an interrupt signal to the second processor.

9. The method according to claim 7, wherein the notification is performed by changing, by the first processor, a value in a register to a predetermined value, and detecting, by the second processor, the changed value,
wherein the register is capable of being written from the first processor and referred to from the second processor.

10. The method according to claim 7, wherein the notification is performed by changing a value in a specific area in the shared memory to a predetermined value by the first processor, and detecting the changed value by the second processor.

11. A method for sending and receiving data between a first processor including a first cache memory and a second processor including a second cache memory via a shared memory, the first and second cache memories having a plurality of cache lines having a fixed length, the method comprising:
classifying, by the first processor, a transfer data area that stores data transferred between the first and second processors in the shared memory, as a first area filling a whole of one cache line in the first cache memory and a second area not filling one cache line in the first cache memory;
securing, by the first processor, a divided data area aligned with a cache line in the first cache memory in the shared memory;
writing, by the second processor, data transferred between the first and the second processors into the first area in the shared memory and the divided data area in the shared memory; and
processing, by the first processor, data written into the first area and the divided data area in the shared memory as data from the second processor.

12. The method according to claim 11, further comprising:
copying data read by the first processor in the divided data area in the shared memory into an area corresponding to the second area in the shared memory; and
processing data in the first area and the second area in the shared memory as data from the second processor.

13. The method according to claim 11, further comprising:
analyzing, by the first processor, cache lines of the first cache memory and the shared memory, and classifying the transfer data area into the first area and the second area.

14. The method according to claim 11, further comprising:
evicting or invalidating, by the first processor, data in an area of the first cache memory corresponding to the first area and the divided data area in the shared memory to the shared memory after securing the divided data area.

15. The method according to claim 11, further comprising:
writing, by the first processor, information for identifying the first area and the divided data area into a predetermined area in the shared memory; and
writing, by the second processor, data into the shared memory based on the information.

16. The method according to claim 15, further comprising:
invalidating, by the second processor, data in an area of the second cache memory corresponding to the first area and the divided data area in the shared memory before writing the data into the shared memory.

17. The method according to claim 15, wherein the predetermined area is a non-cache area in the shared memory.

18. The method according to claim 11, wherein the second area is at least one of an area including a head of the transfer data area and an area including an end of the transfer data area.

19. The method according to claim 11, further comprising:
evicting, by the second processor, data in an area of the second cache memory corresponding to the first area and the divided data area in the shared memory to the shared memory, after writing data into the first area and the divided data area.

20. A multiprocessor system configured to send and receive data between a first processor including a first cache memory and a second processor including a second cache memory via a shared memory, the first and second cache memories having a plurality of cache lines having a fixed length, the system comprising:
the first processor comprising:
a classification unit configured to classify a transfer data area that stores data transferred between the first processor and the second processor in the shared memory, as a first area filling a whole of one cache line in the first cache memory and a second area not filling one cache line in the first cache memory; and
a copying unit configured to copy data in the second area into a divided data area in the shared memory, the divided data area being aligned with a cache line in the first cache memory, and
the second processor comprising:
a processing unit configured to process, while treating data in the divided data area as data in the second area, data in the first area and data in the divided data area as data from the first processor.

21. A multiprocessor system configured to send and receive data between a first processor including a first cache memory and a second processor including a second cache memory via a shared memory, the first and second cache memories having a plurality of cache lines having a fixed length, the system comprising:
the first processor comprising:
a classification unit configured to classify a transfer data area that stores data transferred between the first processor and the second processor in the shared memory, as a first area filling a whole of one cache line in the first cache memory and a second area not filling one cache line in the first cache memory; and
a securing unit configured to secure a divided data area in the shared memory, the divided data area being aligned with a cache line in the second area, and
the second processor comprising:
a writing unit configured to write data transferred between the first processor and the second processor into the first area in the shared memory and the divided data area in the shared memory,
wherein the first processor processes the data written into the first area and the divided data area in the shared memory as data from the second processor.

22. A first processor in a multiprocessor system configured to send and receive data between the first processor including a first cache memory and a second processor including a second cache memory via a shared memory, the first and second cache memories having a plurality of cache lines having a fixed length, the first processor comprising:
a classification unit configured to classify a transfer data area that stores data transferred between the first processor and the second processor in the shared memory, as a first area filling a whole of one cache line in the first cache memory and a second area not filling one cache line in the first cache memory; and
a copying unit configured to copy data in the second area into a divided data area in the shared memory, the divided data area being aligned with a cache line in the first cache memory.

23. A second processor in a multiprocessor system configured to send and receive data between a first processor including a first cache memory and the second processor including a second cache memory via a shared memory, the first and second cache memories having a plurality of cache lines having a fixed length, wherein the first processor classifies transfer data area that stores the data transferred between the first processor and the second processor in the shared memory, as a first area filling a whole of one cache line in the first cache memory and a second area not filling one cache line in the first cache memory, and secures a divided data area in the shared memory, the divided data area being aligned with a cache line in the first cache memory, the second processor comprising:
a writing unit configured to write data transferred between the first processor and the second processor into the first area in the shared memory and the divided data area in the shared memory; and
a notification unit configured to notify for causing the first processor to read data written in the first area and the divided data area in the shared memory, after writing the data by the writing unit.

* * * * *